United States Patent [19]

Yamashita

[11] Patent Number: 5,397,644

[45] Date of Patent: Mar. 14, 1995

[54] MAGNETIC DISK HAVING A SPUTTERED HYDROGEN-DOPED CARBON PROTECTIVE FILM

[75] Inventor: Tsutomu T. Yamashita, San Jose, Calif.

[73] Assignee: Komag, Incorporated, Milpitas, Calif.

[21] Appl. No.: 56,982

[22] Filed: May 3, 1993

Related U.S. Application Data

[60] Continuation of Ser. No. 700,223, May 14, 1991, abandoned, which is a division of Ser. No. 473,540, Feb. 1, 1990, Pat. No. 5,045,165.

[51] Int. Cl.$^6$ ............................ G11B 5/00; B32B 9/00
[52] U.S. Cl. ............................ 428/408; 428/694 TC; 428/900
[58] Field of Search ............... 428/694, 695, 900, 408, 428/694 TC

[56] References Cited

U.S. PATENT DOCUMENTS

| | | | |
|---|---|---|---|
| 4,749,459 | 6/1988 | Yamashita et al. | 204/192.15 |
| 4,772,513 | 9/1988 | Sakamoto et al. | 428/408 |
| 4,778,582 | 10/1988 | Howard | 204/192.15 |
| 4,786,564 | 11/1988 | Chen et al. | 428/694 |
| 4,804,590 | 2/1989 | Nakamura et al. | 428/408 |
| 4,820,584 | 4/1989 | Morita et al. | 428/336 |
| 4,833,031 | 5/1989 | Konokawa et al. | 428/336 |
| 4,877,677 | 10/1989 | Hirochi et al. | 428/216 |
| 5,073,241 | 12/1991 | Watanabe | 204/192.15 |

FOREIGN PATENT DOCUMENTS

| | | |
|---|---|---|
| 0231894 | 1/1987 | European Pat. Off. . |
| 60-155668 | 8/1985 | Japan ............... 204/192.15 |
| 60-157725 | 8/1985 | Japan . |
| 61-117727 | 6/1986 | Japan ............... 204/192.15 |
| 63-081626 | 4/1988 | Japan . |
| 01037711 | 2/1989 | Japan . |
| 01037712 | 2/1989 | Japan . |

OTHER PUBLICATIONS

Howard E. Boyer et al., "Surface Texture and Integrity," Metals Handbook Desk Edition, 1985, pp. 27–20 to 27–21.

Tu Chen et al., "Microstructure And Magnetic Properties of Electroless Co-P Thin Films Grown On An Aluminum Base Disk Substrate," J. Appl. Phys. 49(3), Mar. 1978, pp. 1816–1818.

M. F. Doerner et al., "A Method For Interpreting The Data From Depth-Sensing Indentation Instruments," J. Mater. Res., vol. 1, No. 4, Jul./Aug. 1986, pp. 601–609.

J. K. Howard, "Thin Films For Magnetic Recording Technology: A Review", Journal of Vacuum Science and Technology, Jan. 1986, pp. 1–13.

M. Ishikawa et al., "'Dual-Carbon', A New Surface Protective Film For Thin Film Hard Disks," IEEE Transactions On Magnetics, vol. MAG-22, No. 5, Sep. 1986, pp. 999–1001.

Francis K. King, "Datapoint Thin Film Media," IEEE Transaction on Magnetics, vol. MAG-17, No. 4, Jul. 1981, pp. 1376–1379.

Bruno Marchon et al., "Evidence for Tribochemical Wear on Amorphous Carbon Thin Films", MRM Conference, Sep. 1989.

Y. Suganuma et al., "Production Process and High Density Recording Characteristics of Plated Disks," IEEE Transactions on Magnetics, vol. MAG-18, No. 6, Nov. 1982, pp. 1215–1220.

R. Ahlert et al., "a Wear-Resistant Coating", Sep., 1986.

(List continued on next page.)

Primary Examiner—Stevan A. Resan
Attorney, Agent, or Firm—Skjerven, Morrill, MacPherson, Franklin & Friel

[57] ABSTRACT

A carbon film for protecting a magnetic disk is sputtered in the presence of hydrogen. If a sufficient amount of hydrogen is present in the sputtering chamber, the resulting carbon film will exhibit superior mechanical characteristics, i.e. an enhanced wear resistance during a contact-start-stop or drag test in a disk drive. Sputtering in the presence of hydrogen can be accomplished by either DC or RF magnetron sputtering, or DC or RF diode sputtering.

11 Claims, 9 Drawing Sheets

OTHER PUBLICATIONS

Khan, et al., "Carbon Overcoat and the Process Dependence on its Microstructure and Wear Characteristics," IEEE Transactions on Magnetics, vol. 24, No. 6, Nov. 1988, pp. 2647–2649.

S. Agarwal, "Structure and Morphology of RF Sputtered Carbon Overlayer Films," IEEE Transactions on Magnetics, vol. MAG-21, No. 5, Sep. 1985, pp. 1527–1529.

Zeira et al., "Wear Characteristic Dependence of Carbon Overcoats on Target Material," IEEE Transactions on Magnetics, vol. 26, No. 1, Jan. 1990, pp. 179–180.

B. Bhushan, "Tribology and Mechanics of Magnetic Storage Devices," Springer-Verlag, New York Inc., 1990, pp. 144–673.

Savvides, et al., "Diamondlike Amorphous Carbon Films Prepared by Magnetron Sputtering of Graphite," J. Vac. Sci. Technol. A3 (6), American Vacuum Society Nov./Dec. 1985, pp. 2386–2390.

Kurokawa, et al., "Application of Diamond Like Carbon Films to Metallic Thin Film Magnetic Recording Media," IEEE Transactions on Magnetics, vol. MAG-23, No. 5, Sep. 1987, pp. 2410–2412.

Dillion, et al., "Use of Raman Scattering to Investigate Disorder and Crystallite Formation in As-Deposited and Annealed Carbon Films," The American Physical Society, Mar. 1984, pp. 3482–3489.

Cho, et al., "Power Density Effects in the Physical and Chemical Properties of Sputtered Diamond-like Carbon Thin Films," Mat. Res. Soc. Symp. Proc. vol. 164, 1990 Materials Research Society, pp. 309–314.

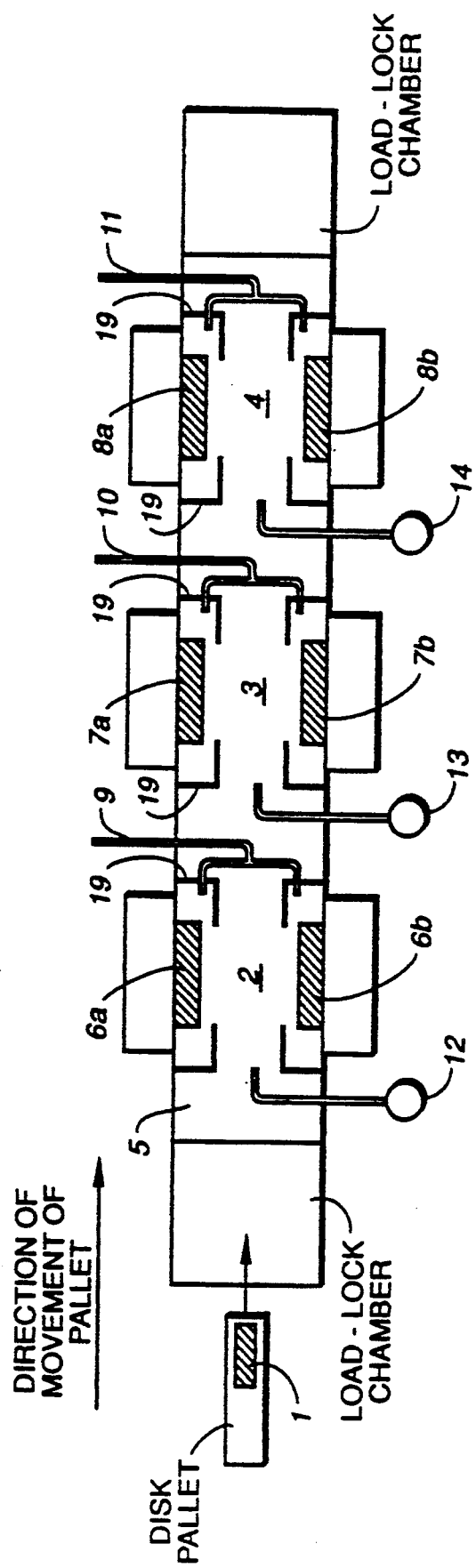
FIG._1

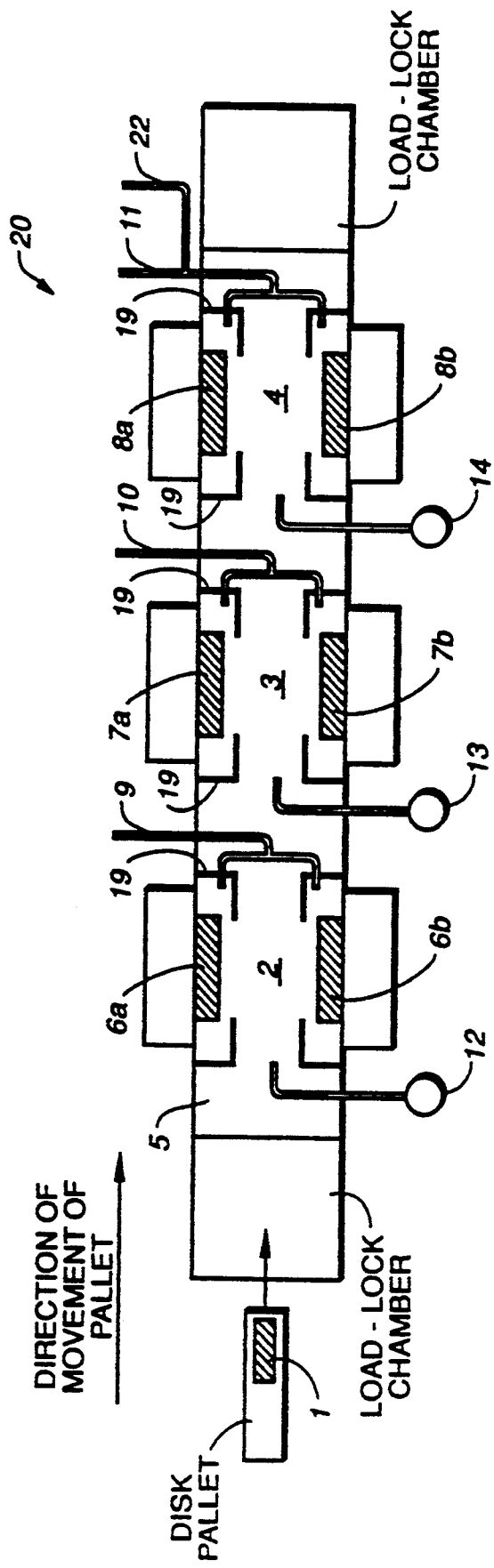
FIG._2

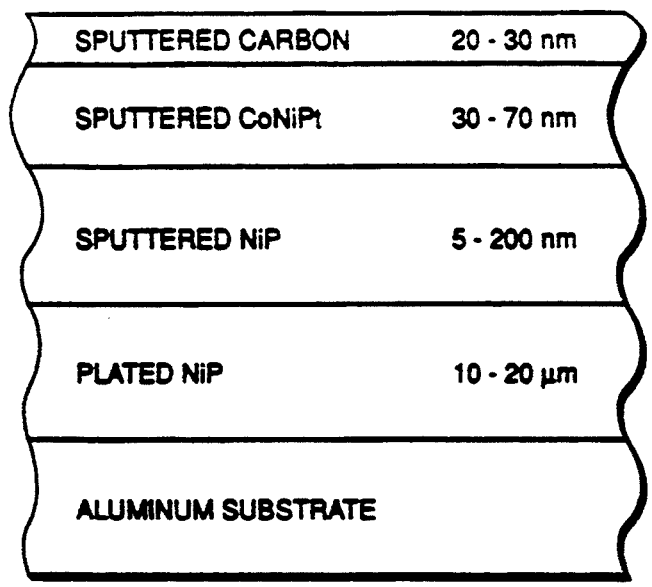
FIG._3
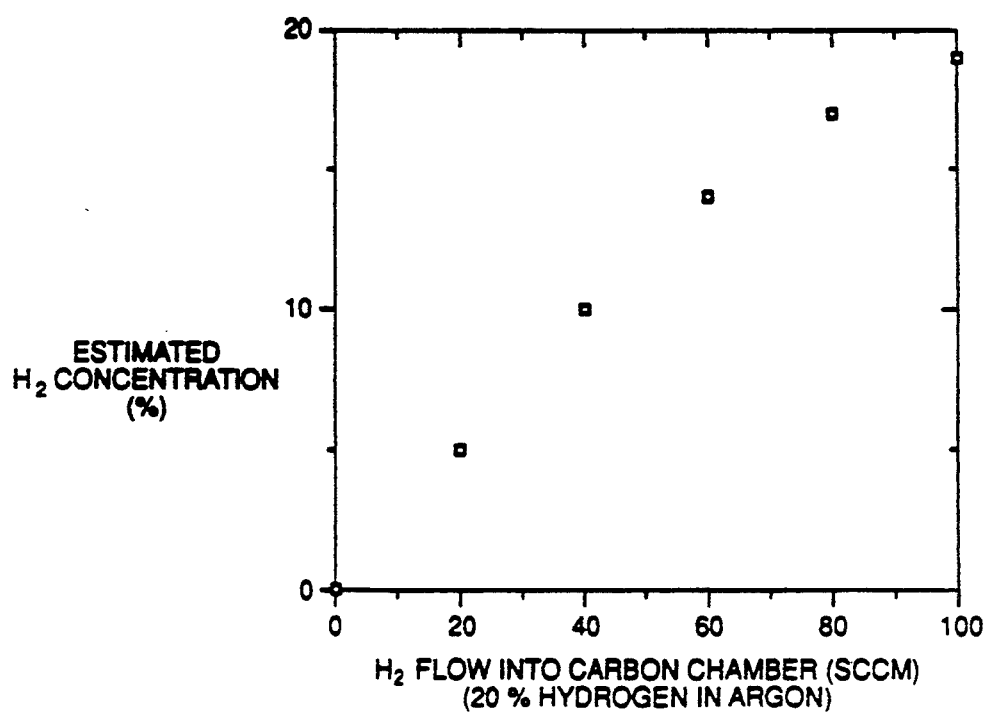
FIG._4

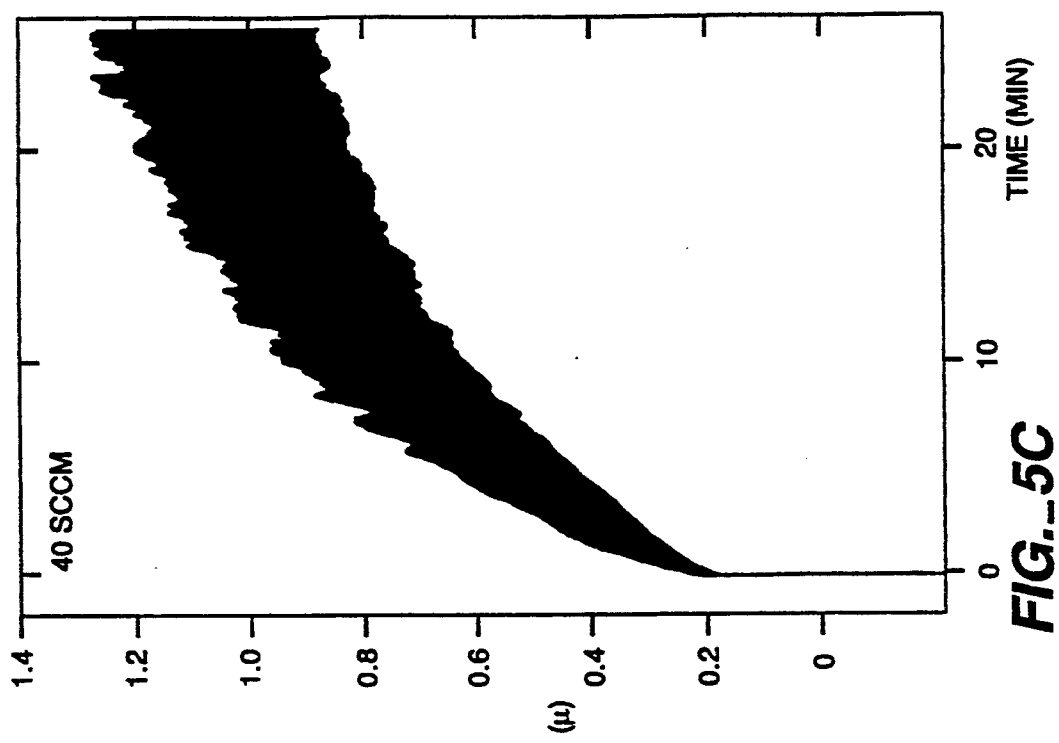
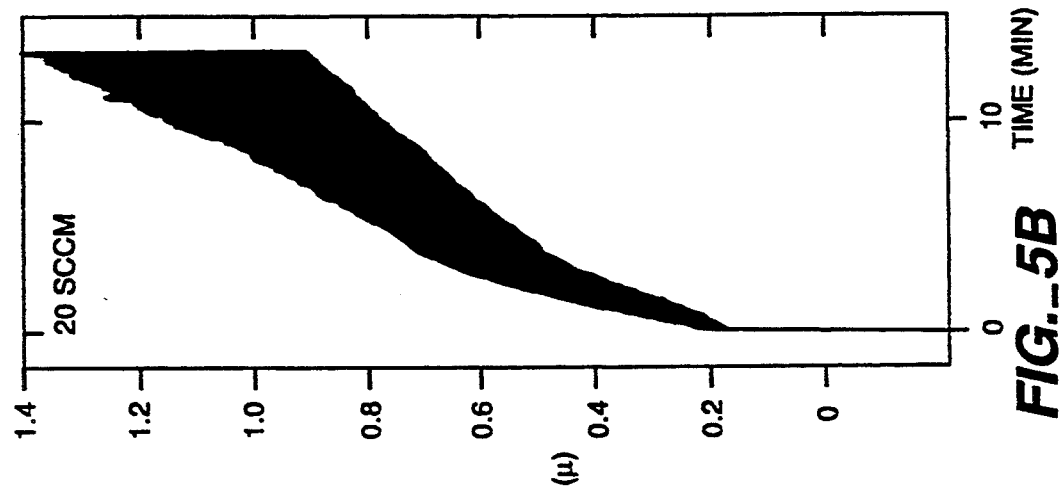
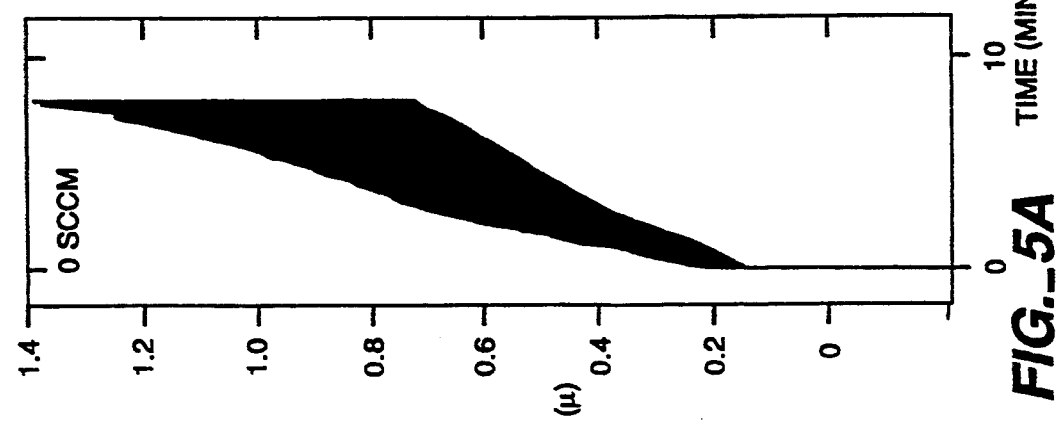
FIG._5A  FIG._5B  FIG._5C

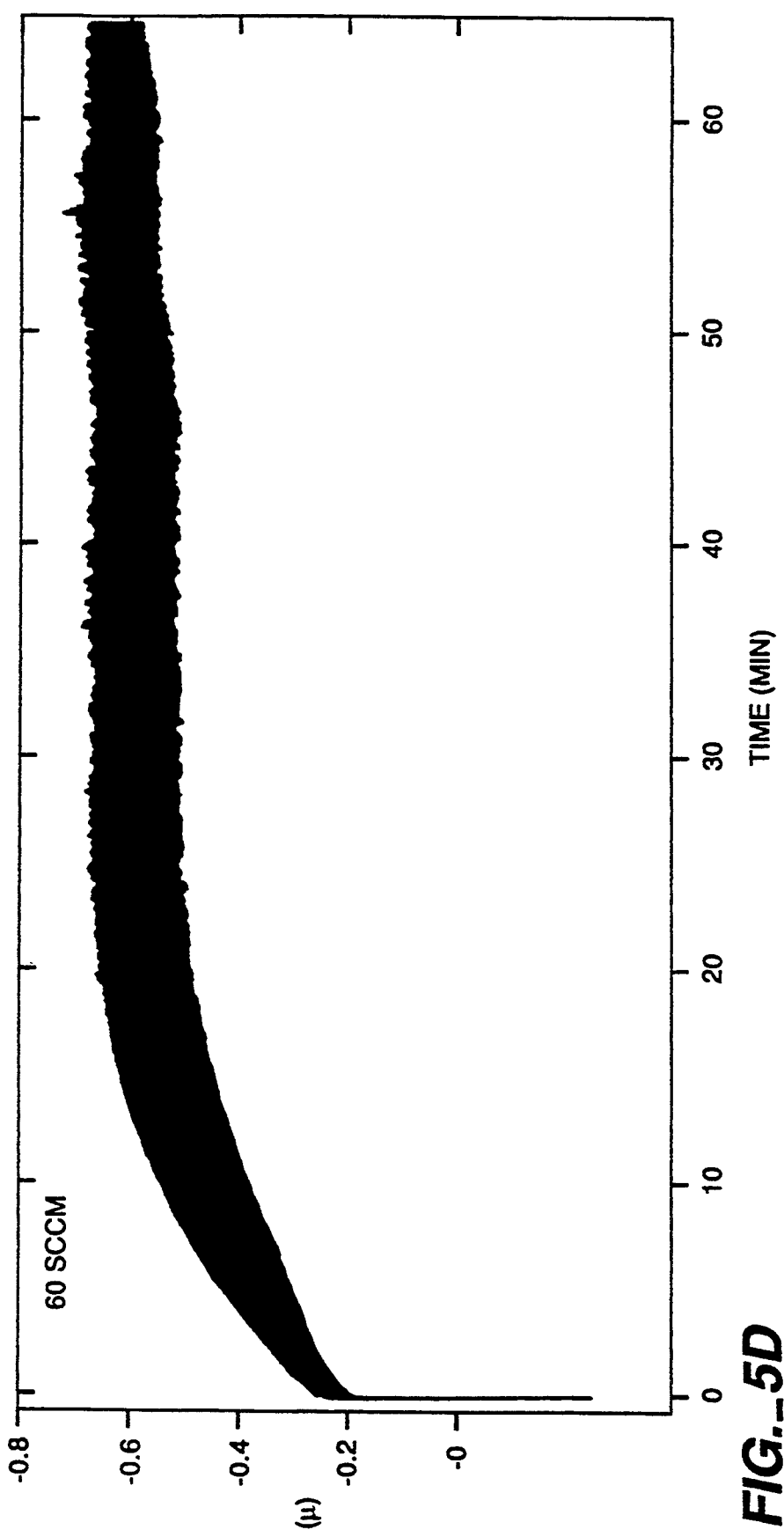
FIG._5D

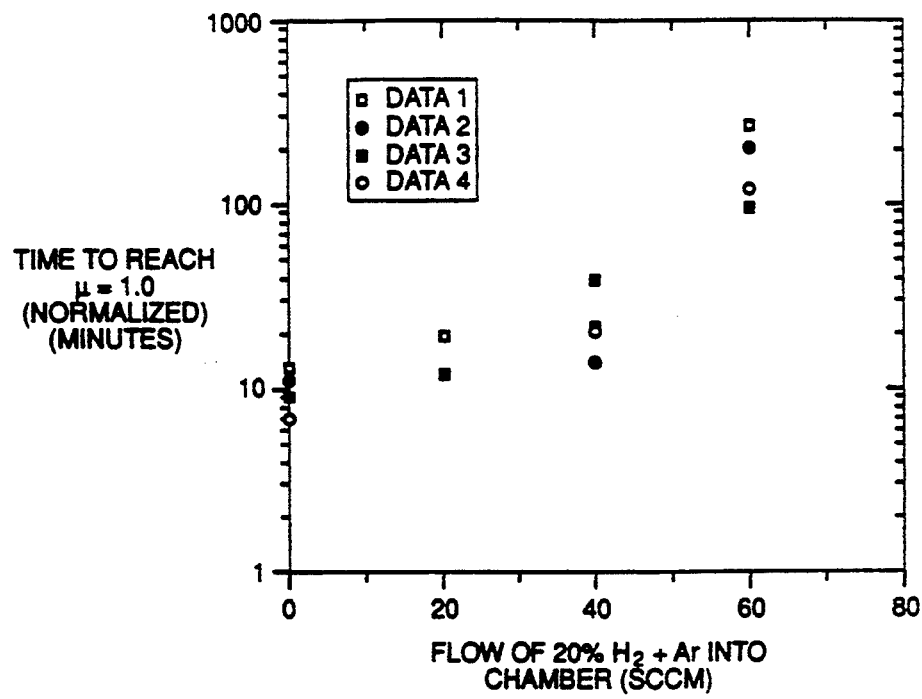
FIG._6
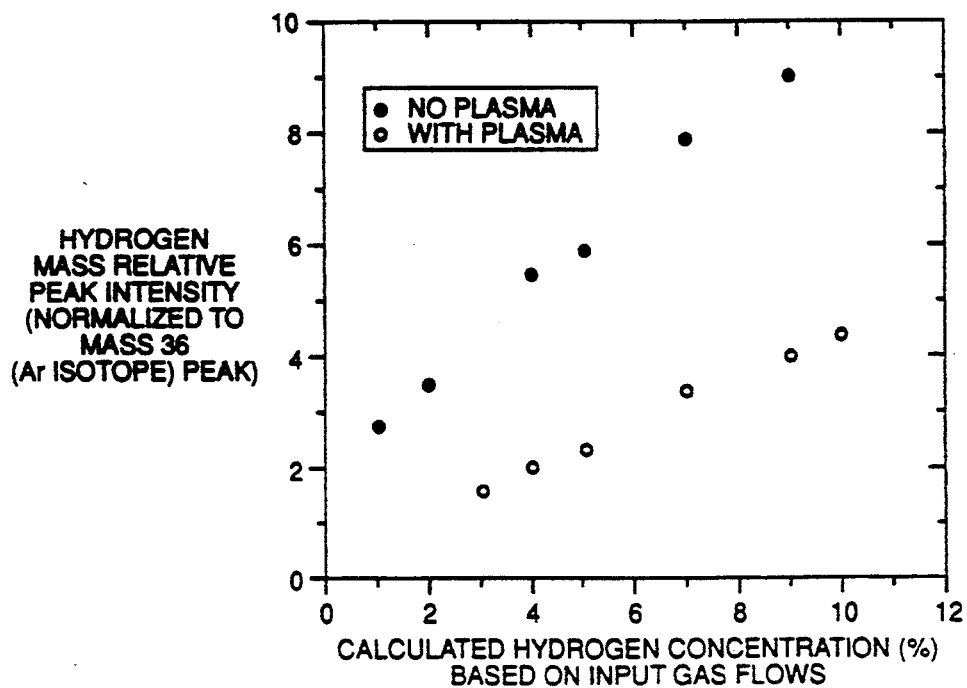
FIG._7

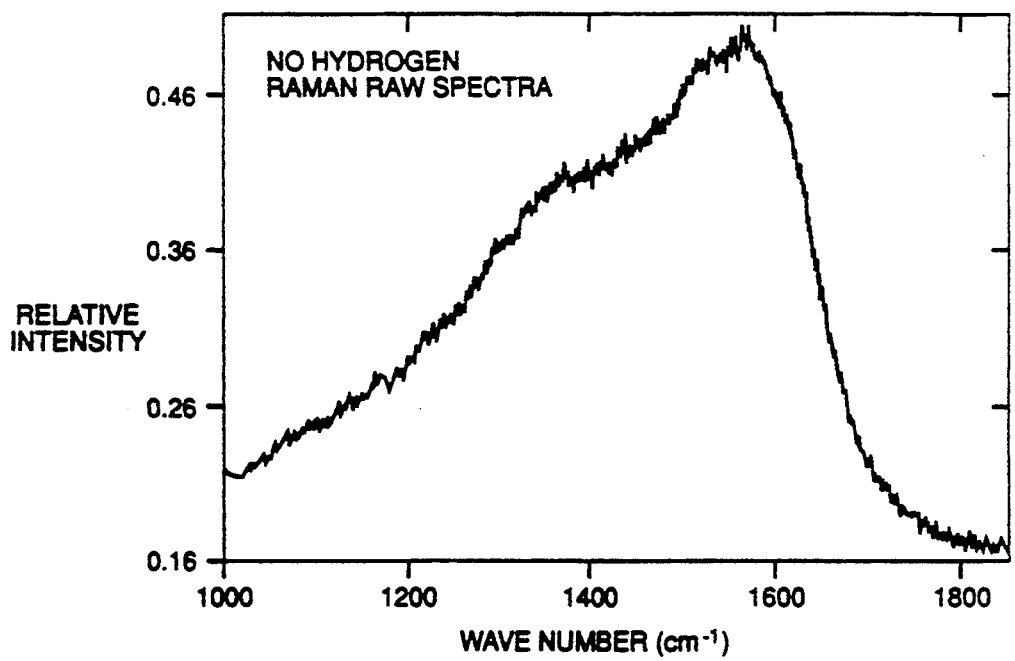
FIG._8A
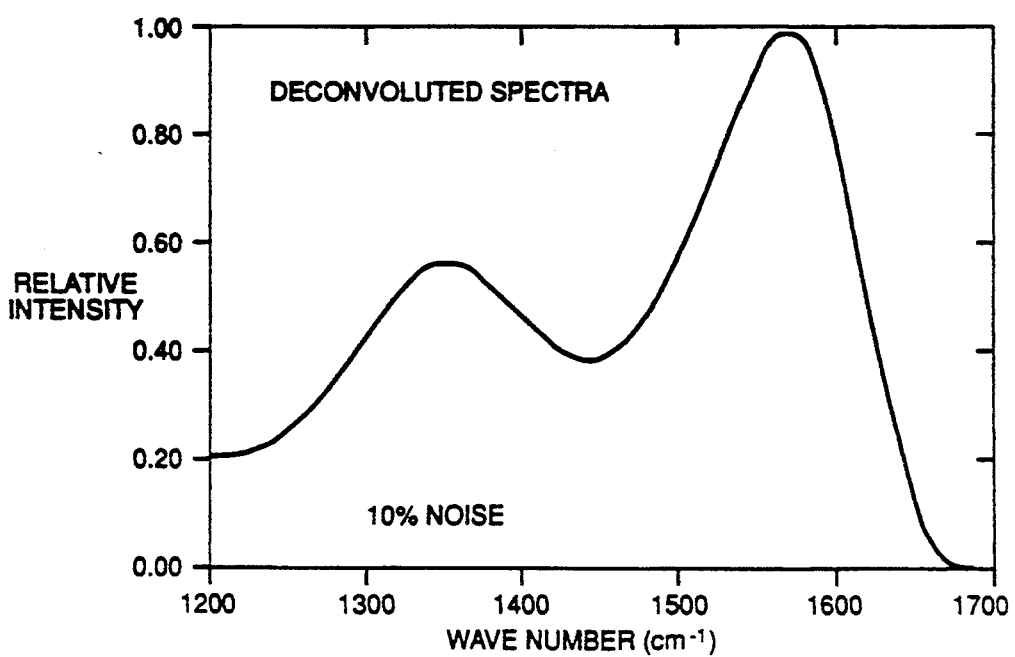
FIG._8B

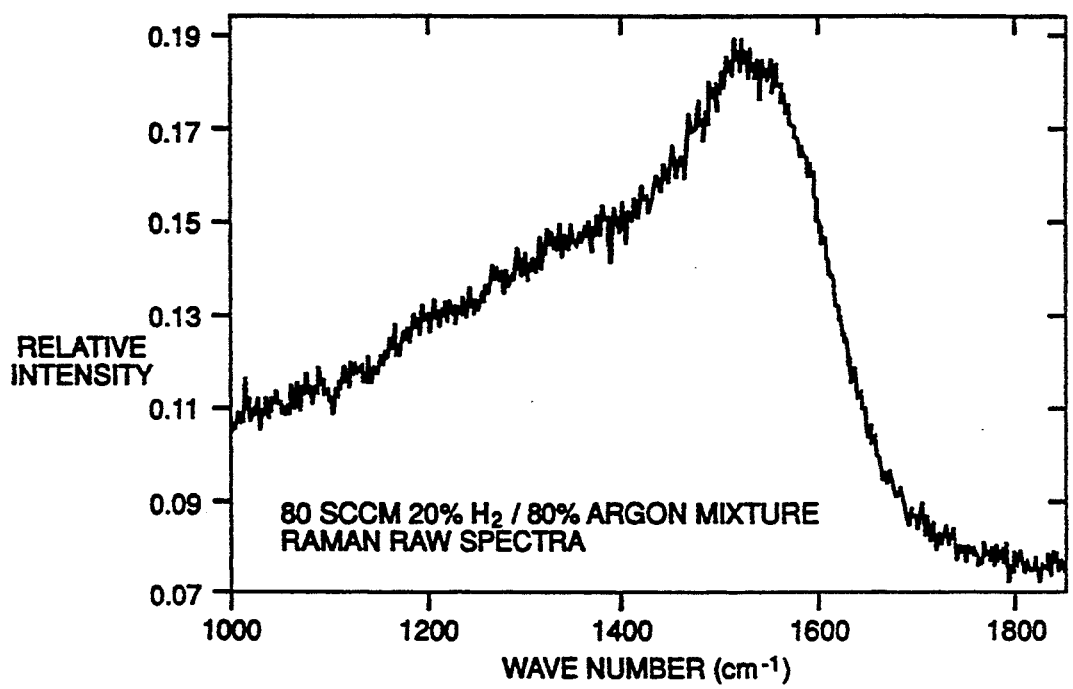
FIG._8C
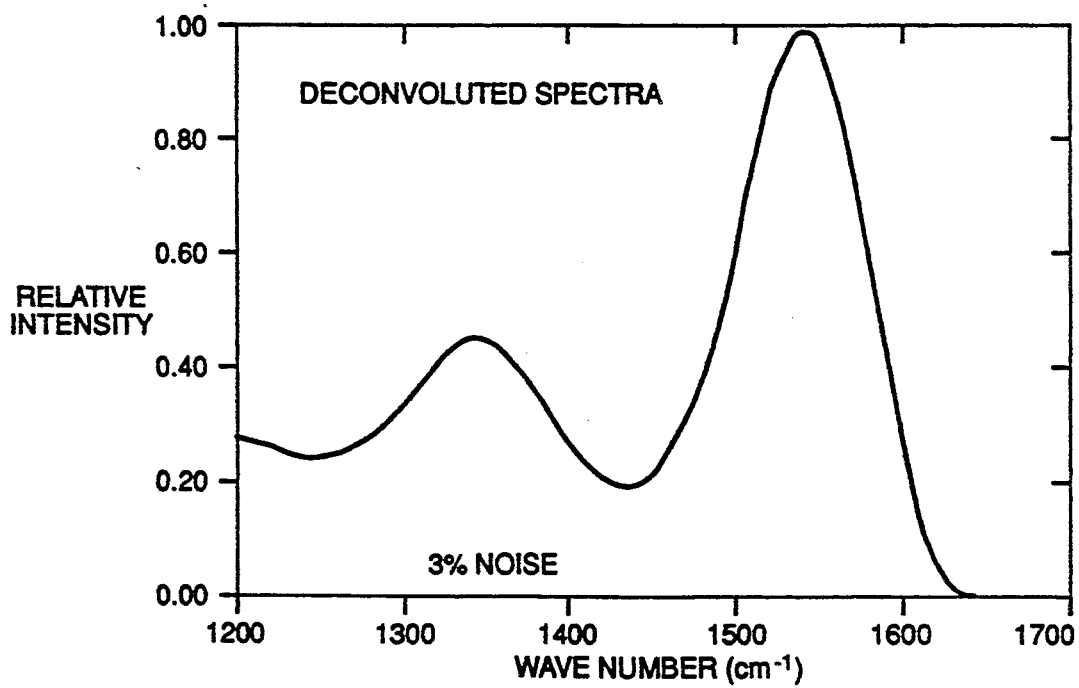
FIG._8D

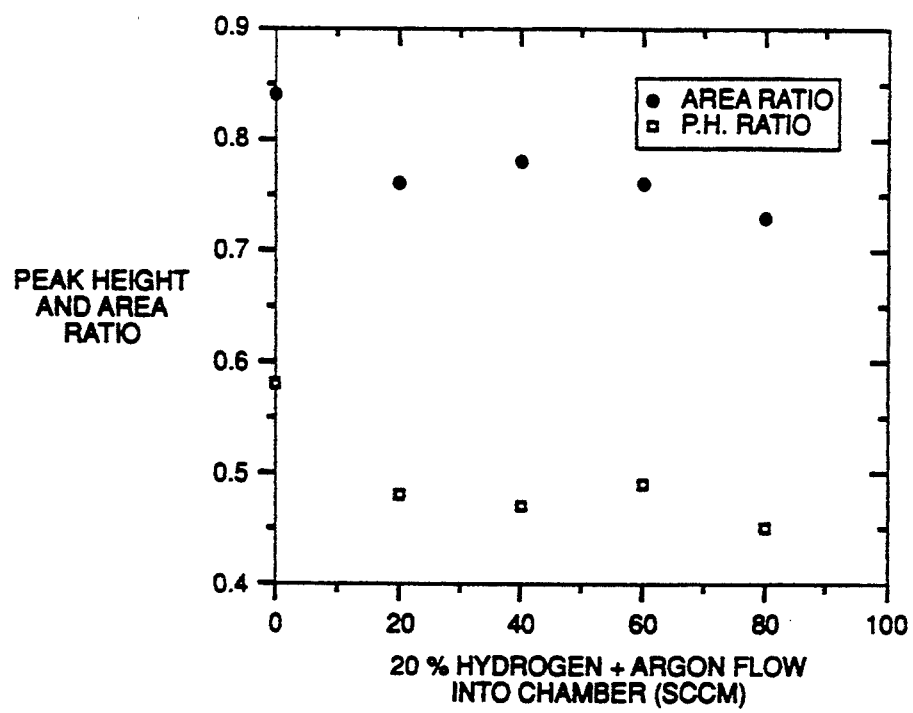
FIG._9
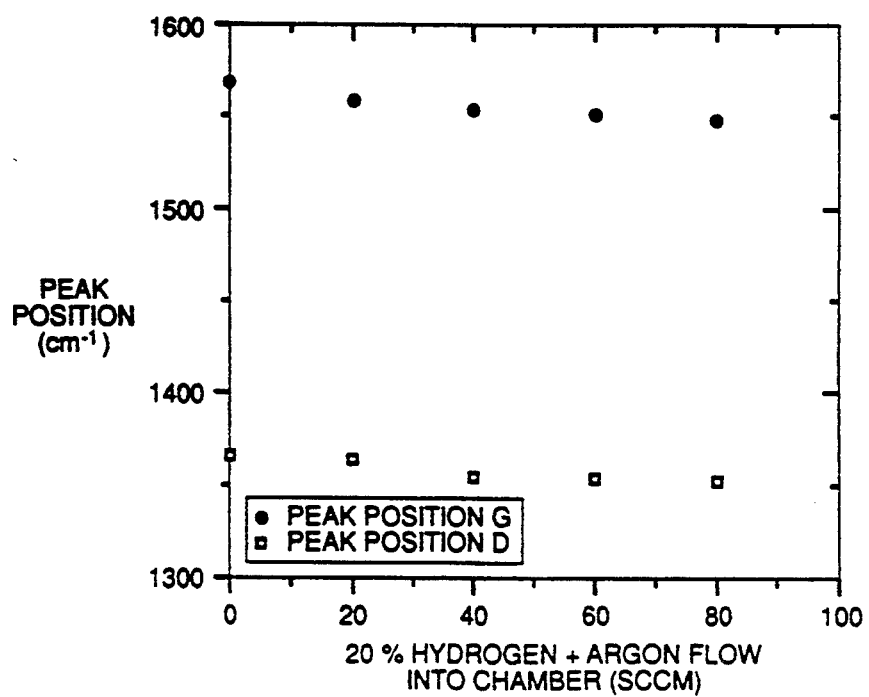
FIG._10

MAGNETIC DISK HAVING A SPUTTERED HYDROGEN-DOPED CARBON PROTECTIVE FILM

This application is a continuation of application Ser. No. 07/700,223, now abandoned, filed May 14, 1991, which is a division of application Ser. No. 07/473,540, filed Feb. 1, 1990, now U.S. Pat. No. 5,045,165.

BACKGROUND OF THE INVENTION

This invention relates to carbon films used to protect magnetic media.

Metallic magnetic thin film disks used in memory applications typically comprise a substrate material which is coated with a magnetic alloy film which serves as the recording medium. Typically, the recording medium used in such disks is a cobalt-based alloy such as Co—Ni, Co—Cr, Co—Ni—Cr, Co—Pt or Co—Ni—Pt which is deposited by vacuum sputtering as discussed by J. K. Howard in "Thin Films for Magnetic Recording Technology: A Review", published in Journal of Vacuum Science and Technology in January 1986, incorporated herein by reference. Other prior art recording media comprises a Co—P or Co—Ni—P film deposited by chemical plating as discussed by Tu Chen et al. in "Microstructure and Magnetic Properties of Electroless Co—P Thin Films Grown on an Aluminum Base Disk Substrate", published in the Journal of Applied Physics in March, 1978, and Y. Suganuma et al. in "Production Process and High Density Recording Characteristics of Plated Disks", published in IEEE Transactions on Magnetics in November 1982, also incorporated herein by reference.

Usually it is necessary to protect such magnetic media by sputtering a protective overcoat such as a carbon overcoat. An example of such a sputtered carbon overcoat is described by F. K. King in "Data Point Thin Film Media", published in IEEE Transactions on Magnetics in July 1981, incorporated herein by reference. Unfortunately, bare carbon films typically exhibit an excessively high friction coefficient and poor wear resistance, thus necessitating the application of a lubricant layer to the carbon.

It is also known to provide a carbon film containing hydrogen by using a plasma chemical vapor deposition technique, e.g. as described by Ishikawa et al. in "Dual Carbon, A New Surface Protective Film For Thin Film Hard Disks", IEEE Transactions on Magnetics, September 1986 incorporated herein by reference. During such a process, a hard, durable carbon layer (which Ishikawa refers to as i-carbon) is magnetron-sputtered over a film of a magnetic alloy. Thereafter, a second carbon film (p-carbon), which exhibits a lower friction coefficient than the i-carbon, is deposited by plasma-decomposition of a hydrocarbon gas. (In a variation of this process, Ishikawa discusses plasma decomposing the hydrocarbon gas to form first and second p-carbon layers exhibiting different mechanical properties on the magnetic alloy.)

Unfortunately, Ishikawa's p-carbon layer is difficult to manufacture in a typical continuous in-line sputter deposition production machine. Such a machine is schematically illustrated in FIG. 1, in which a nickel-phosphorus underlayer, a magnetic alloy film and protective carbon overcoat are sputtered onto a substrate 1 in portions 2, 3 and 4 of a single sputtering chamber 5. Substrate 1 is continuously moved by a carrier pallet past nickel-phosphorus alloy sputtering targets 6a, 6b, magnetic alloy sputtering targets 7a, 7b and carbon sputtering targets 8a, 8b. Target shields 19 surround sputtering targets 6 to 8 as shown. Gas sources 9, 10 and 11 introduce argon gas into chamber 5 to facilitate sputtering, while pumps 12, 13 and 14 remove gas from chamber 5. Such in-line sputtering apparatus is widely used in industry today due to its lower cost of operations and simplicity. The Ishikawa plasma decomposition process cannot be performed in in-line sputtering apparatus because Ishikawa's process requires vacuum conditions considerably different than those used in magnetic alloy deposition. Further, gases used in Ishikawa's process (i.e. hydrocarbon gases) can have an adverse effect on the properties of the magnetic layer. This problem is discussed in U.S. Pat. No. 4,778,582, issued to J. K. Howard, which indicates that methane in his sputtering chamber adversely affected the magnetic coercivity of a resulting magnetic alloy. (Col. 2, lines 43–47).

It is also known to deposit carbon films in the presence of small quantities of hydrogen gas. The Howard patent advocates adding a very small quantity of hydrogen to a sputtering chamber in an attempt to render the resulting magnetic disk corrosion resistant. (The mechanism responsible for reduction in corrosion in Howard's process is not well understood.) Unfortunately, Howard does not provide any indication as to how one could improve the wear characteristics of his hydrogen-doped carbon film.

SUMMARY OF THE INVENTION

I have discovered that sputtering carbon onto a magnetic disk in the presence of a large amount of hydrogen causes the resulting carbon film to exhibit superior wear characteristics. Because of this, I can extend the useful life of a magnetic disk. The presence of hydrogen does not adversely affect deposition of other layers elsewhere in the sputtering chamber. Sputtering can be accomplished using DC or RF magnetron sputtering or DC or RF diode sputtering.

BRIEF DESCRIPTION OF THE DRAWINGS

FIG. 1 schematically illustrates prior art continuous in-line sputtering production apparatus.

FIG. 2 schematically illustrates sputtering apparatus used to form the films of FIGS. 3 to 10.

FIG. 3 illustrates in cross section a magnetic disk constructed in accordance with my invention.

FIG. 4 illustrates the relationship between hydrogen concentration adjacent targets 8a and 8b (FIG. 2) and the gas flow provided by gas source 22 when gas source 11 is off.

FIG. 5A illustrates the wear characteristics of a carbon overcoat sputtered onto a magnetic disk in which no hydrogen was present in the sputtering system.

FIG. 5B illustrates the wear characteristics of a carbon film formed on a magnetic disk in which 20 SCCM of a 20% hydrogen 80% argon gas mixture was introduced into the sputtering chamber during carbon deposition. (Percentages are by volume.)

FIG. 5C illustrates the wear characteristics of a carbon film formed on a magnetic disk in which 40 SCCM of the 20% hydrogen 80% argon gas mixture was introduced into the sputtering chamber during carbon deposition.

FIG. 5D illustrates the wear characteristics of a carbon film formed on a magnetic disk in which 60 SCCM of the 20% hydrogen 80% argon gas mixture was introduced into the sputtering chamber during carbon deposition.

FIG. 6 illustrates the relationship between the increase in friction coefficient between a read/write head and a carbon protective film and time elapsed during a drag test for carbon films sputtered in the presence of varying amounts of hydrogen.

FIG. 7 is a residual gas analysis mass spectrometer measurement of the hydrogen mass peak intensity as a function of calculated hydrogen concentration in a sputtering chamber with the plasma on and with the plasma off.

FIGS. 8A and 8C illustrate Raman spectroscopy curves of carbon films sputtered in the presence and absence of hydrogen, respectively. FIGS. 8B and 8D are deconvoluted spectra of FIGS. 8A and 8C respectively.

FIG. 9 illustrates the D/G peak height and area ratios for Raman spectra of carbon films sputtered in the presence of varying amounts of hydrogen.

FIG. 10 illustrates the positions of the D and G peaks in Raman spectra for varying amounts of hydrogen.

DETAILED DESCRIPTION

FIG. 2 schematically illustrates sputtering apparatus 20 typically used in accordance with my invention. It should be understood, however, that other types of sputtering apparatus could also be used in conjunction with my invention. Sputtering apparatus 20 includes a chamber 5 in which a substrate 1 is placed. Substrate 1 is typically an aluminum disk plated on both sides with a nickel-phosphorus alloy. Substrate 1 is mechanically coupled to a disk pallet carrier which moves substrate 1 past a first, second and third pair of targets 6a, 6b, 7a, 7b and 8a, 8b. Targets 6a, 6b are used to sputter a NiP alloy onto substrate 1 as discussed in U.S. Pat. No. 4,786,564, issued to Chen et al., and incorporated herein by reference. Targets 7a, 7b are thereafter used to sputter a cobalt-nickel-platinum alloy onto substrate 1, while targets 8a, 8b are thereafter used to sputter carbon onto substrate 1. The substrate is then removed from the sputtering chamber. FIG. 3 illustrates in cross section, the resulting disk.

Typical sputtering targets have a width W between 5 and 10 inches. In one embodiment, targets having a width of 8 inches are used. Targets 7a, 7b are separated from targets 8a, 8b and 6a, 6b by a distance D1 of about 1.5 meters. Targets 6a, 7a, 8a are separated from targets 6b, 7b, 8b by a distance D2 of about 6 inches or less. Because of the spacing of the pair of targets, sputtered particles from targets 6 to 8 do not interfere with sputtering from adjacent targets.

Apparatus 20 also includes gas sources 9 to 11 for introducing an inert gas such as argon in the vicinity of targets 6 to 8, respectively. (In other embodiments other inert gases such as krypton or xenon may be used.) Gas evacuation pumps 12 to 14 are provided to remove gas from the vicinity of targets 6 to 8, respectively.

In accordance with one important feature of my invention, a fourth gas source 22 introduces an argon hydrogen gas mixture into chamber 5 in the vicinity of targets 8a, 8b. Thus, during carbon deposition, hydrogen is present in chamber 5 in quantities sufficient to alter the mechanical characteristics of the carbon overcoat. By altering the amount of gas provided by sources 11 and 22, the amount and concentration of hydrogen in the vicinity of targets 8a, 8b are controlled. Of importance, even if hydrogen from gas source 22 diffuses into the vicinity of targets 6a, 6b, 7a or 7b, the hydrogen does not have an adverse effect on the sputtering of the nickel-phosphorus or cobalt-nickel-platinum alloys. In one embodiment, a barrier or wall may be provided to restrict the flow of hydrogen from gas source 22 towards targets 7a, 7b thereby enhancing the hydrogen concentration adjacent targets 8a, 8b.

In one embodiment, an 80:20 argon-hydrogen gas mixture is provided by gas source 22. The reason for this is that hydrogen is explosive, and the presence of tanks of pure hydrogen represent a hazard. In other embodiments, source 22 can provide a gas mixture with other hydrogen concentrations. However, a sufficiently high concentration of hydrogen in the hydrogen/argon gas mixture is required to maintain a high concentration of $H_2$ at carbon targets 8a and 8b.

FIGS. 5A through 5D illustrate the results of drag tests performed on carbon films formed on a 130 mm diameter magnetic disk. The disks included NiP plated to a thickness of 10 to 15 $\mu$m onto an aluminum substrate, and were textured with concentric patterns to a roughness of 40 Å RA. ("RA" is a well known parameter of surface roughness, and is described in the Metals Handbook, edited by H. E. Boyer and T. L. Gall, published by the American Society for Metals in 1985.) During the drag tests, the disks were rotated at 45 rpm while a read/write head dragged across the disk surface approximately 2.11 inches from the center of the disk. The read write heads were thin film heads composed of TiC and $Al_2O_3$, and were pushed against the carbon films in a direction perpendicular to the films with a force of 10 grams. The read-write heads were affixed to a piezo-electric sensor which sensed the strain that the head experienced. (No lubricant was applied to the carbon in these tests.) The X axis in FIGS. 5A through 5D is in units of time. The Y axis is in units of dynamic friction coefficient. The disk in FIG. 5A was manufactured by turning off gas source 11 and 22, so there was no hydrogen in chamber 5. (Any argon present at sputtering targets 8a, 8b originated from gas sources 9 and 10.) As can be seen, without any hydrogen present in the film, the friction coefficient rose to a value of over 1.0 in less than 6 minutes. (The test was terminated shortly after the friction coefficient reached 1.0 to avoid damaging the piezo-electric sensor attached to the read/write head.)

The trace of the friction coefficient has a certain amount of width in FIG. 5A. This is because the friction coefficient varies around the circumference of the disk.

The disk of FIG. 5B was manufactured with gas source 22 providing 20 SCCM of the 80% argon/20% $H_2$ mixture. (In other words, 4 SCCM of $H_2$ was introduced into chamber 5.) The friction exhibited by the resulting carbon film rose from a value of 0.2 to 1.0 in less than 8 minutes.

In FIG. 5C, 40 SCCM of the 80% argon/20% $H_2$ mixture was introduced into sputtering chamber 5 by source 22 while source 11 was off. The friction coefficient exhibited by the resulting carbon film rose to 1.0 in 12 minutes.

In FIG. 5D, 60 SCCM of the 80% argon/20% $H_2$ mixture was provided by gas source 22 while gas source 11 was off. The friction coefficient from the resulting carbon film rose to a level of about 0.7 and then stopped rising, even after 66 minutes, and the test was terminated.

Although during the above experiments gas source 11 was off, gas source 11 can be used to vary the hydrogen concentration adjacent targets 8a, 8b.

FIG. 4 illustrates the relationship between gas flow from source 22 (20% H$_2$/80% argon) and the concentration of hydrogen at targets 8a, 8b. Because of diffusion and gas flow between the different target areas, the hydrogen concentration at targets 8a, 8b does not equal exactly 20%. The curve of FIG. 4 was estimated taking into account the geometry of the sputtering system and flow pattern of gases in the system. (The hydrogen concentration at targets 8a, 8b is substantially equal to the hydrogen concentration at the substrate when the substrate is between targets 8a and 8b.)

Typically, magnetic disks are unacceptable if the friction coefficient is greater than 1.0. Accordingly, the disks of FIGS. 5A, 5B and 5C wore out and became unacceptable relatively quickly. However, as mentioned above, the disk of FIG. 5D remained acceptable, even after 66 minutes. Accordingly, it is seen in FIGS. 5A–5D that the greater the hydrogen concentration in the sputtering chamber, the greater the carbon film performance.

FIG. 6 illustrates the time required during the drag tests for a disk to exceed a friction coefficient of 1.0. The disks produced under gas flows of 0, 20, 40 and 60 SCCM of the 80% argon/20% H$_2$ mixture in FIG. 6 were generated under the same gas flow conditions as FIGS. 5A, 5B, 5C and 5D, respectively. The Y axis of FIG. 6 is logarithmic. As can be seen, the lifetime of the carbon film is increased by more than an order of magnitude by introducing 60 SCCM of a 20% H$_2$/80% argon gas flow hydrogen into the sputtering chamber. The data points for disks manufactured when gas source 22 provided 60 SCCM of the argon/H$_2$ mixture were estimated, based on slope of the friction vs. time curves from drag tests. The plot in FIG. 6 shows, for a group of samples prepared under different hydrogen concentrations, that a small amount of hydrogen will have almost no effect on the mechanical characteristics of the carbon film, whereas a large amount of hydrogen will have a very dramatic effect on the carbon.

The reason hydrogen affects the friction exhibited by the disks is not completely understood. I have three theories concerning why this result is achieved. According to the article entitled "Evidence for Tribochemical Wear on Amorphous Carbon Thin Films" by Bruno Marchon et al., published at the proceedings of the MRM Conference in Rimini, Italy in 1989 (incorporated herein by reference), carbon wears out primarily through an oxidation phenomenon. When a read/write head strikes a magnetic disk, a great amount of force is exerted on a small portion of the carbon film by the read/write head. This causes localized heating and oxidation of the carbon film. Thus, Marchon reported that carbon wear was prevented or drastically reduced by conducting contact-start-stop tests in a nitrogen (oxygen-free) atmosphere. It is possible that hydrogen doping the carbon film also drastically reduces localized oxidation.

Another possible reason why introduction of hydrogen into a carbon film retards the increase in friction is that as the read/write head and the carbon film wear, the amount of contact area between the read/write head and the disk increases. The presence of hydrogen in the carbon film reduces an attractive force between the read/write head and the carbon, and thus retards the increase in the friction coefficient even when the contact area between the read/write head and carbon increases due to wear.

A third theory as to why hydrogen in a carbon film retards the increase in friction is that hydrogen-doped films exhibit a greater degree of elasticity. (Experimental data pertaining to this effect is provided below.) Thus, the carbon film is more compliant (elastic), and may be able to absorb the shock loading of the film by the read/write head, thereby allowing the film to last longer.

The hydrogen introduced at targets 8a, 8b is actually incorporated into the sputtered carbon film. This was demonstrated by using a sampling gas mass spectrometer or residual gas analyzer (RGA) to monitor the consumption rate of hydrogen near the carbon sputtering targets. A plot of the hydrogen mass peak intensity versus calculated hydrogen concentration with the plasma on and off (i.e. when sputtering is taking place and not taking place, respectively) is shown in FIG. 7. The RGA output is in arbitrary units, but is proportional to the amount of hydrogen in the sputtering chamber near targets 8a, 8b. From this data, it can be determined that plasma at the carbon targets consumes approximately one half of the hydrogen introduced at the carbon cathode area, indicating that the plasma causes reaction of input hydrogen and results in incorporation of hydrogen into the carbon film. (Unless otherwise stated, hydrogen concentrations elsewhere in this specification and claims refer to concentrations calculated as if there were no hydrogen consumption during sputtering. It is believed, however, that the hydrogen concentration is about 50% of this calculated value at targets 8a, 8b when the plasma is on.)

Raman spectroscopy is a useful technique for obtaining information regarding the bonding characteristics of carbon atoms within the deposited film. See D. S. Knight, et al., "Characterization of Diamond Films", J. Mater. Res. Vol 4, No. 2, March/April 1989, and Willard et al., Instrumental Methods of Analysis, 6th Edition, published by Wadsworth Publishing Co. in 1981, incorporated herein by reference. Typical spectra of a carbon film with no hydrogen is shown in FIG. 8A. Typically the spectra is characterized by broad overlapping peaks around 1310/cm (generally known as the D-peak) and 1550/cm (generally known as the G-peak). The peaks can be deconvoluted to obtain more accurate peak position and intensity values. The deconvoluted spectra is shown in FIG. 8B. The Raman spectra of a film produced using 80 SCCM of the 20% H$_2$/80% argon mixture is shown in FIG. 8C. There is a change in the ratio of the D to G peaks, as well as a slight shift in the peak positions as seen in the deconvoluted spectra of FIG. 8C, shown in FIG. 8D. The G and D peaks shift to lower frequencies as hydrogen is added. The change in peak ratio expressed in terms of height and area ratios as a function of the amount of hydrogen present during sputtering is plotted in FIG. 9, and height position is plotted in FIG. 10. Raman spectra shows a clear indication of the changes in chemistry of the carbon atoms within the film as more hydrogen is added. Based on changes in the SP3/SP2 peak intensity ratios, it is apparent that the carbon becomes more amorphous.

Typically, a carbon film lacking hydrogen has a brown to greyish color at a thickness of about 300 Å. The sheet resistance at this thickness is about 0.5MΩ/square, using a four point probe measurement. Resistivity of a 300 Å carbon film made with 20 SCCM of the 20% hydrogen/80% argon mixture was measured using a four point probe. The resistance was greater than 20MΩ/square. Further, the carbon film sputtered with 20 SCCM 20% $H_2$/80% argon was yellow when formed on a metallic alloy, and colorless if formed on glass. This indicates that hydrogen in the sputtering chamber introduces chemical and structural changes in the resulting carbon film.

A specially made 2000 Å thick carbon coating was made in order that micro-hardness measurements can be taken of the carbon coating with various amounts of hydrogen. The method used for the hardness and elastic constant determination is described by M. F. Doerner et al. in "A Method For Interpreting The Data From Depth-Sensing Indentation Instruments", published in J. Mater. Res., July/August 1986, p. 601. Table 1 below lists the values which were obtained.

| Flow Rate of the 20% Hydrogen/80% Ar mixture | Hardness | Elasticity |
| --- | --- | --- |
| 0 SCCM | 8 GPa | 140 GPa |
| 60 SCCM | 8 GPa | 92 GPa |
| 90 SCCM | 8 GPa | 85 GPa |

As can be seen, the hardness of the film does not change as more hydrogen is added. However, the elastic constant decreases drastically. The film becomes less stiff as more hydrogen is added. As mentioned above, this may explain the difference in wear.

From measurements of chemical, electrical, optical and mechanical properties it is clear that there is a significant change in the sputtered carbon film as high concentration of hydrogen is introduced into the plasma during deposition. It is strongly believed that consumption of hydrogen by the plasma as measured by residual gas analyzer clearly indicates incorporation of hydrogen into the carbon film. The large improvement in the mechanical performance of the carbon film as measured by continuous friction test occurs at a concentration of hydrogen at the carbon cathode of about 15% of the total gas present.

Although the above-described process uses $H_2$, in other embodiments, gaseous compounds containing hydrogen, such as $H_2O$ and $NH_3$, can be used in sputtering chamber 5. Such compounds decompose during sputtering and the hydrogen from the compound dopes the carbon film. Further, hydrogen or a gaseous compound containing hydrogen can be mixed with inert gases other than argon.

While the invention has been described with respect to specific embodiments, those skilled in the art will recognize that changes can be made in form and detail without departing from the spirit and scope of the invention. For example, a liquid or solid lubricant can be applied to the carbon layer after sputtering to further enhance mechanical performance. In addition, an intermediate layer may be provided between the magnetic alloy and the carbon film. The disk can be textured in a conventional manner to further reduce friction. Also, substrates other than aluminum, e.g. glass, may be used. Accordingly, all such changes come within the present invention.

I claim:

1. A magnetic data storage device comprising:
a layer of magnetic media; and
only one carbon film formed on said layer of magnetic media, said carbon film having uniform morphology throughout and having predominantly SP2 bonding sputtered by RF diode, DC diode, RF magnetron or DC magnetron sputtering onto said media in the presence of a sufficient amount of gaseous molecules containing hydrogen to substantially enhance the mechanical wear resistance of said carbon film, said carbon film being substantially amorphous and wherein there is substantially no crystal phase material located within said carbon film, said carbon film being the upper-most vacuum-deposited layer on said magnetic data storage device, said carbon film having a hardness on the order of about 8 GPa and an elasticity less than or equal to about 92 GPa.

2. Device of claim 1 wherein the carbon film is formed by sputtering the carbon from a sputtering target in the presence of an input gas flow which would provide a hydrogen concentration adjacent the sputtering target of at least about 15% if sputtering were not taking place.

3. Device of claim 1 wherein said presence of hydrogen is sufficient to at least double the useful life of the resulting carbon film in a mechanical drag test.

4. Device of claim 1 wherein said carbon film is sputtered in an environment essentially free of hydrocarbon gases.

5. A magnetic data storage structure comprising:
a layer of magnetic media; and
only one carbon film formed on said layer of magnetic media, said carbon film having uniform morphology throughout sputtered by RF diode, DC diode, RF magnetron or DC magnetron sputtering onto said media from a sputtering target, said carbon film being substantially amorphous and wherein there is substantially no crystal phase material located within said carbon film, said carbon film having predominantly SP2 bonding, said carbon being sputtered from said sputtering target in the presence of a gas flow comprising molecules containing hydrogen such that the concentration of the molecules containing hydrogen in the vicinity of said sputtering target would be greater than or equal to about 15 percent if sputtering were not taking place, said carbon film being the upper-most vacuum-deposited layer on said magnetic data storage structure, wherein said carbon film has a hardness on the order of about 8 GPa and an elasticity less than or equal to about 92 GPa.

6. Magnetic data storage structure of claim 5 wherein the electrical sheet resistance of said carbon film is greater than about 20MΩ/square.

7. Magnetic data storage structure of claim 5 wherein the resistivity of said carbon film is greater than or equal to about 60 Ohm-cm.

8. Magnetic data storage structure of claim 5 wherein hydrogen is incorporated into said carbon film, said hydrogen substantially increasing the electrical resistance exhibited by said carbon film.

9. Magnetic data storage structure of claim 5 wherein said carbon film is sputtered onto said media from said sputtering target in a sputtering chamber, the amount of hydrogen in said sputtering chamber being sufficient to at least double the useful life of said carbon film in a mechanical wear drag test.

10. Magnetic data storage structure of claim 5 wherein said carbon film is sputtered onto said media from said sputtering target in a sputtering chamber, the amount of hydrogen in said sputtering chamber being sufficient to at least triple the useful life of said carbon film in a mechanical wear drag test.

11. A magnetic memory comprising:

a layer of magnetic media; and only one carbon film formed on said layer of magnetic media, said carbon film having uniform morphology throughout sputtered by RF diode, DC diode, RF magnetron or DC magnetron sputtering onto said media from a sputtering target, said carbon film being substantially amorphous wherein there is substantially no crystal phase material located within said carbon film, said carbon film having predominantly SP2 bonding, said carbon being sputtered from said sputtering target in the presence of a gas flow comprising molecules containing hydrogen such that the concentration of the molecules containing hydrogen in the vicinity of said sputtering target is greater than or equal to about 7.5% when sputtering is taking place, said carbon film being the upper-most vacuum-deposited layer on said magnetic memory, said carbon film having a hardness on the order of about 8 GPa and an elasticity less than or equal to about 92 GPa.

* * * * *